United States Patent
Chmielus

(10) Patent No.: US 10,491,135 B1
(45) Date of Patent: Nov. 26, 2019

(54) DEVICE AND A METHOD TO LIMIT INRUSH CURRENT OF SINGLE PHASE INPUT IN AN ELECTRIC POWER SYSTEM

(71) Applicant: Infineon Technologies Austria AG, Villach (AT)

(72) Inventor: Stephan Chmielus, Bad Lippspringe (DE)

(73) Assignee: Infineon Technologies Austria AG (AT)

( * ) Notice: Subject to any disclaimer, the term of this patent is extended or adjusted under 35 U.S.C. 154(b) by 0 days.

(21) Appl. No.: 16/048,504

(22) Filed: Jul. 30, 2018

(51) Int. Cl.
| | |
|---|---|
| *H02M 7/06* | (2006.01) |
| *H02M 1/32* | (2007.01) |
| *H02M 9/00* | (2006.01) |
| *H02H 9/00* | (2006.01) |
| *H02H 7/125* | (2006.01) |
| *H02H 7/16* | (2006.01) |

(52) U.S. Cl.
CPC ............ *H02M 7/062* (2013.01); *H02H 7/125* (2013.01); *H02H 9/002* (2013.01); *H02M 1/32* (2013.01); *H02H 7/16* (2013.01)

(58) Field of Classification Search
CPC ............ H02M 1/32; H02M 1/36; H02M 7/06; H02M 7/062; H02H 7/125; H02H 7/16; H02H 9/002
See application file for complete search history.

(56) References Cited

U.S. PATENT DOCUMENTS

| | | | | |
|---|---|---|---|---|
| 4,396,882 A * | 8/1983 | Kellenbenz | .............. | H02H 9/02 323/278 |
| 2008/0247105 A1* | 10/2008 | Divan | .................... | H02H 3/207 361/56 |
| 2013/0234779 A1* | 9/2013 | Klug, Jr. | .......... | H03K 17/04123 327/432 |
| 2013/0329330 A1* | 12/2013 | Srinivas | ................. | H02H 9/002 361/93.9 |
| 2016/0226370 A1* | 8/2016 | Gonthier | ................. | H02M 1/32 |
| 2016/0359422 A1* | 12/2016 | Yuan | ....................... | H02M 1/36 |
| 2018/0323608 A1* | 11/2018 | Valdivia Guerrero | ....................... | H03K 17/082 |

\* cited by examiner

*Primary Examiner* — Fred E Finch, III
(74) *Attorney, Agent, or Firm* — Design IP

(57) ABSTRACT

An electric power system includes an input bridge rectifier configured to convert an AC voltage to a DC voltage; a DC capacitor configured to charge to an DC output voltage based on the DC voltage; and a voltage controlled active semiconductor device coupled to the input bridge rectifier to control a current through at least one of the input bridge rectifier and the DC capacitor. The voltage controlled active semiconductor device includes a switching device including a control terminal that receives a control voltage such that the switching device conducts the current based on the control voltage; and a voltage controlled circuit coupled to the switching device along a path of the current and having a total effective resistance. The voltage controlled circuit is configured to regulate the current based on the total effective resistance, and change the total effective resistance based on a voltage feedback parameter.

22 Claims, 6 Drawing Sheets

DEVICE AND A METHOD TO LIMIT INRUSH CURRENT OF SINGLE PHASE INPUT IN AN ELECTRIC POWER SYSTEM

FIELD

The present disclosure relates generally to driver circuits and electric power systems, and, more particularly, to limiting inrush currents in driver circuits and electric power systems.

BACKGROUND

Many functions of modern devices in automotive, consumer and industrial applications, such as converting electrical energy and driving an electric motor or an electric machine, rely on power semiconductor devices. For example, Insulated Gate Bipolar Transistors (IGBTs), Metal Oxide Semiconductor Field Effect Transistors (MOSFETs) and diodes, to name a few, have been used for various applications including, but not limited to switches in power supplies and power converters.

A power semiconductor device usually comprises a semiconductor structure configured to conduct a load current along a load current path between two load terminal structures of the device. Further, the load current path may be controlled by means of a control electrode, sometimes referred to as gate electrode. For example, upon receiving a corresponding control signal from, e.g., a driver unit, the control electrode may set the power semiconductor device in one of a conducting state and a blocking state.

In the driver stage of an inverter, there is typically a direct current (DC) capacitor that is charged from an alternating current (AC) input. As an example, to drive three-phase motors from a single-phase input, it is typical to use an input bridge rectifier, a DC capacitor, and voltage source inverter (VSI). The input bridge rectifier charges the DC capacitor from the single phase AC input. During steady state operation, the DC capacitor in front of the VSI provides a nearly constant DC voltage which is transferred by the VSI to the voltage and current levels required to operate the motor.

However, during power-up of the application, the DC capacitor has to be charged completely starting at zero charge or at a low-level of charge up to the steady state level. Depending on the size of DC capacitor, the charging may result in a very high inrush current causing a huge stress on the input bridge rectifier and the DC capacitor.

Therefore, an improved device capable of limiting inrush current may be desirable.

SUMMARY

The present disclosure relates generally to driver circuits and electric power systems, and, more particularly, to limiting an inrush current in a driver circuit and electric power systems. Specifically, embodiments provide devices and methods to limit the inrush current that may be directed to single-phase low-power applications and that may implement a solid-state relay (SSR).

Embodiments provide a solid-state relay that includes a switching device including a control terminal, the switching device configured to receive a control voltage at the control terminal and conduct a channel current through the switching device based on the control voltage; a powering circuit including a primary side that receives a control current and a secondary side isolated from the primary side, where the secondary side is configured to generate the control voltage based on the control current; and a voltage controlled circuit coupled to the switching device along a path of the channel current and having a total effective resistance, where the voltage controlled circuit is configured to regulate the channel current based on the total effective resistance, and where the voltage controlled circuit is configured to change the total effective resistance based on a voltage feedback parameter.

Embodiments further provide an electric power system that includes an input bridge rectifier configured to convert an alternating current (AC) voltage to a direct current (DC) supply voltage; a DC capacitor configured to charge to an DC output voltage based on the DC supply voltage; and a voltage controlled active semiconductor device coupled to the input bridge rectifier to control a current through at least one of the input bridge rectifier and the DC capacitor The voltage controlled active semiconductor device includes a switching device including a control terminal, the switching device configured to receive a control voltage at the control terminal and conduct the current through the switching device based on the control voltage; and a voltage controlled circuit coupled to the switching device along a path of the current and having a total effective resistance, where the voltage controlled circuit is configured to regulate the current based on the total effective resistance, and where the voltage controlled circuit is configured to change the total effective resistance based on a voltage feedback parameter.

Embodiments further provide a method of controlling a current in an electric power system. The method includes operating a switching device in a linear mode operation in which a current through the switching device is in saturation; and in response to the switching device operating in the linear mode operation, regulating the current through the switching device based on a control function and a voltage feedback parameter, wherein the control function is configured to modify a resistance along a path of the current based on the voltage feedback parameter.

BRIEF DESCRIPTION OF THE DRAWINGS

Embodiments are described herein making reference to the appended drawings.

DETAILED DESCRIPTION

Figure 1:
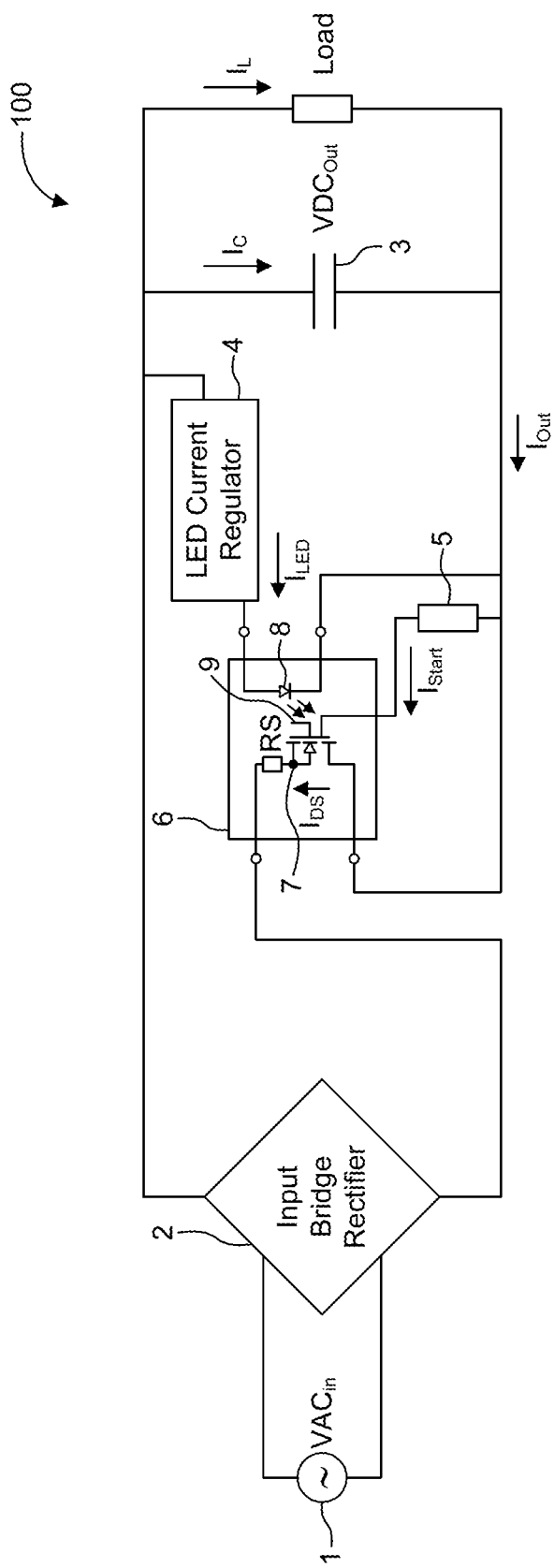
FIG. 1 shows a schematic diagram of an electric power system according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "front", "behind", "back", "leading", "trailing", "below", "above" etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

A sensor may refer to a component which converts a physical quantity to be measured to an electric signal, for example, a current signal or a voltage signal. The physical quantity may, for example, be a current or a voltage drop across an electrical component.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

A "power semiconductor device" as used herein may be a semiconductor device on one or more chips with one or more semiconductor components (e.g., transistors), and may include a single-phase input for low-power applications (e.g., up to 100 W).

Specific embodiments described in this specification pertain to, without being limited thereto, a power semiconductor device that may be used within a power converter or a power supply. Thus, in an embodiment, the power semiconductor device may be configured to carry a load current that is to be supplied to a load and/or, respectively, that is provided by a power source. For example, the semiconductor device may comprise one or more active power semiconductor cells, such as a monolithically integrated diode cell, and/or a monolithically integrated transistor cell. Such diode cell and/or such transistor cells may be integrated in a power semiconductor module.

Power semiconductor devices that include transistors which are suitably connected to form half-bridges are commonly used in the field of power electronics. For example, half-bridges may be used for driving electric motors or switched mode power supplies.

Transistors may include Insulated Gate Bipolar Transistors (IGBTs) and Metal Oxide Semiconductor Field Effect Transistors (MOSFETs) (e.g., Si MOSFETs or SiC MOSFETs). While IGBTs may be used as an example in the embodiments below, it will be appreciated that MOSFETs may be substituted for the IGBTs and vice versa. In this context, when substituting a MOSFET for an IGBT, a MOSFET's drain may be substituted for an IGBT's collector, the MOSFET's source may be substituted for the IGBT's emitter, and the MOSFETs drain-source voltage $V_{DS}$ may be substituted for the IGBT's collector-emitter voltage $V_{CE}$ in any one of the examples described herein. Thus, any IGBT module may be substituted by a MOSFET module and vice versa.

FIG. 1 shows a schematic diagram of an electric power system 100 according to one or more embodiments. The electric power system 100 may be a driver circuit implemented in various power electronic applications. For example, the electric power system 100 may be implemented as the input stage (i.e., driver stage) of a charge pump, a power inverter, switch mode power supply (SMPS), a power drive for a motor or charge pump, or the like, to drive the load. The electric power system 100 may be an input stage of a driver circuit in which a direct current (DC) link is provided to an output stage (not shown) of the driver circuit. At the DC link, a DC voltage may be provided as the output of the input stage of the driver circuit and as an input to the output stage of the driver circuit. Here, the output stage of the driver circuit may be considered as the load for explanation purposes.

The electric power system 100 includes an alternating current (AC) voltage source 1, an input bridge rectifier 2, and a direct current (DC) capacitor 3. The AC voltage source 1 generates a single phase AC input voltage $V_{ACin}$ and supplies $V_{ACin}$ to the input bridge rectifier 2, which may be a diode bridge rectifier. The input bridge rectifier converts an AC input voltage $V_{ACin}$ or current to a DC supply voltage or current and charges the DC capacitor 3 (e.g., to supply voltage to a load). The DC capacitor 3 stores an output DC voltage $V_{DCout}$, which may then be supplied to a load. The DC capacitor 3 may be a smoothing capacitor that converts the rippled output of the input bridge rectifier 2 into a more smooth DC output voltage $V_{DCout}$.

The electric power system 100 also includes an LED current regulator 4, a startup resistor 5, and a solid-state relay (SSR) 6. During power-up of the electric power system 100, the DC capacitor 3 is charged completely starting at zero or at low level of charge up to a steady state level. These additional components are used to control and/or limit the inrush current that may be generated during the power-up phase of the electric power system 100, prior to the DC capacitor 3 reaching a steady-state. The power-up phase may refer to the phase prior to the DC capacitor 3 reaching a steady-state.

The SSR 6 is a voltage controlled active semiconductor device that includes three functional blocks—a normally-off output stage by the switch 7, an intrinsic load current limitation by RS, and an isolated, self-powering unit by LED 8 and optical coupling. In particular, the SSR 6 includes a voltage controlled circuit RS, which is represented as a resistor RS. As used herein, voltage controlled circuit RS and resistor RS may be used interchangeably. Resistor RS may also be referred to as a feedback resistor RS. The structure of the voltage controlled circuit RS will be described in detail below.

The SSR further includes a switch 7, an LED 8, and photodetector 9 coupled to a gate terminal of the switch 7. The switch 7 may be a transistor switch (MOSFET or IGBT) configured to be operated in a linear mode of operation. The resistor RS is configured to limit the inrush current by implementing a well-controlled linear mode operation of the switch 7. Thus, the SSR 6 includes an inrush current limiter (ICL) in the way of the resistor RS.

The SSR 6 is a normally-off electronic switching device that switches on or off when a small external voltage is applied across its control terminal (e.g., the gate terminal of the switch 7). The SSR 6 includes a converter (e.g., photosensitive diode 9) that generates a current (or voltage) that responds to an appropriate input (control signal), a solid-state electronic switching device (e.g., switch 7) which switches power to the load circuitry, and a coupling mechanism (e.g., the LED 8 and the photo-sensitive diode 9) to enable the control signal to activate this switch 7 without mechanical parts. The coupling mechanism includes a primary side where the LED 8 is provided and a secondary side where the photo-sensitive diode 9 is provided. The coupling mechanism may be generally referred to as a transformer or converter.

In this example, the SSR 6 uses optical coupling to transfer power from the primary side to the secondary side. In this case, a control current $I_{LED}$ (i.e., LED current or primary current) energizes an internal LED 8 which illuminates and switches on the photo-sensitive diode 9 (photovoltaic). A diode current (i.e., a secondary current) on the secondary side generated by the photo-sensitive diode 9 turns on the switch 7 to switch the load. The optical coupling allows the control circuit (i.e., the switch 7 and resistor RS) to be electrically isolated from the load current IL.

While examples described herein refer to using optical coupling to transfer power from primary side to the secondary side of the SSR 6, any interface that is configured to transfer power from the primary side to the secondary side may be used. For example, magnetic coupling by way of a coil transformer (e.g., a coreless transformer) may also be used. Thus, the LED current regulator 4 may also be generally referred to as a current regulator (e.g., when not regulating an LED current). Here, the LED current is a specific type of control current for this example, but is not limited thereto. In any case, the control voltage (i.e., the gate voltage) of the switch 7 is derived from the input on the current regulator (primary) side. For example, the primary current of 1 mA may be converted to a secondary current of 1 μA. The LED current regulator 4 is connected between a high-side of the electric power system 100, to derive the control current $I_{LED}$ therefrom, and the LED 8.

As noted above, the switch 7 is configured to be operated in linear mode. Linear mode operation (i.e., linear mode) refers to the current saturation region in the output characteristics, and may also be referred to as the saturation region or saturation mode of the switch. The drain current ($I_{DS}$) is nearly independent of the drain-to-source voltage ($V_{DS}$) for a given gate-to-source ($V_{GS}$) voltage. The drain current ($I_{DS}$) depends then directly on the voltage $V_{GS}$ of the switch 7. Thus, the gate voltage directly modifies the impedance of the switch 7 in a substantially linear manner. Since the current $I_{DS}$ begins to flow when a channel between the drain and the source is created at transistor turn-on, the current $I_{DS}$ may also be referred to as a channel current or a load current.

Since the LED current regulator 4 is behind the SSR 6 (i.e., behind the switch), a start-up resistor 5 is used to trigger a current flow through the LED 8. The start-up resistor 5 is connected between the low-side of the electric power system 100, to derive a start-up current $I_{start}$ therefrom, and the control terminal of the switch 7.

A start-up phase is an initial phase of the power-up phase. Initially, during the start-up phase, current flows from the input bridge rectifier 2, through the DC capacitor 3, through the start-up resistor 5, to the gate of the switch 7. The switch 7 is a normally-off device. However, in combination with the start-up resistor 5, the switch 7 and the start-up resistor 5 behave like a normally-on switch.

This initial start-up current $I_{start}$ charges the gate slightly (i.e., pre-charge), which results in the switch 7 turning on slightly and to start conducting. This charging of the gate enables the control current $I_{LED}$ to start flowing through the LED 8. The current $I_{LED}$ flowing through the LED 8 is then used to further charge the gate (e.g., via optical coupling) to further or fully turn on the switch 7. Therefore, during the very first moment of the power-up process, the start-up resistor 5 ensures a pre-charging of the gate which initiates a current flow $I_{LED}$ through the LED 8. In other words, the switch 7 may already be turned on slightly due to charging of the gate before control current $I_{LED}$ starts to flow through the LED 8. Once the control current $I_{LED}$ starts to flow through the LED 8, the start-up phase can be regarded as complete. In addition, once the control current $I_{LED}$ starts to flow, a charging current Ic starts to flow through the DC capacitor 3 and the DC capacitor 3 begins to charge.

The control current $I_{LED}$ flowing through the LED current regulator 4 continues to increase until it reaches a certain value that is sufficient to operate the switch 7 in linear mode (i.e., when $V_{GS} > V_{th}$ and $V_{DS} \geq (V_{GS} - V_{th})$, where $V_{th}$ is a voltage threshold of the transistor). Upon entering linear mode, the switch 7 is regarded as fully turned on. For example, a control current $I_{LED}$ of 3 mA may be sufficient to transfer enough power to the photo-sensitive diode 9 such that the gate voltage is sufficient to operate the switch 7 in linear mode. Meanwhile, the DC capacitor 3 continues to charge.

Once the control current $I_{LED}$ reaches the certain value to enable linear mode operation of the switch 7, further control of switch 7 is taken over by the SSR 6. Once the current Iout through the output stage reaches a pre-defined level, the SSR 6 itself will limit the charging current by operating the output stage in linear mode operation. In steady-state operation, the DC voltage $V_{DCout}$ will stabilize the operation of SSR 6.

In addition, the resistance value of the start-up resistor 5 is selected such that, following the start-up phase and including steady-state operation, the start-up resistor 5 is substantially bypassed so that power losses through the start-up resistor 5 are negligible. Thus, after the start-up phase, current flows from input bridge rectifier 2, through the DC capacitor 3, and substantially bypasses the start-up resistor 5. Instead of flowing through the start-up resistor, the current I flows through the switch 7 from drain to source, through resistor RS, and back to the input bridge rectifier 2. In addition, a small current continuously flows through the LED current regulator 4. Thus, once the control current $I_{LED}$ reaches the certain value, the LED current regulator 4 behaves as a constant current source to the LED 8 of the SSR 6 to maintain operation of the switch 7 in linear mode. For example, the control current $I_{LED}$ may be maintained at 3 mA according to the previous example to maintain operation of the switch 7 in linear mode.

The feedback resistor RS symbolizes the implementation of a voltage controlled current limitation. In other words, the feedback resistor RS is not simply a resistor but is instead a voltage controlled circuit that includes current regulating circuitry coupled to the current path of $I_{DS}$ of the switch 7 of the SSR 6 and control logic that receives a voltage feedback parameter to control the current regulating circuitry. For example, as shown in FIG. 1, the voltage controlled circuit RS is coupled to a source terminal of the switch 7. A control function is built into the current regulating circuitry and the control logic to actively change a total effective resistance of the voltage controlled circuit (i.e., of the feedback resistor RS) to modulate the current $I_{DS}$ flowing through the switch 7. That is, the voltage controlled circuit RS is an adjustable resistive device with active feedback control of the resistance. Additionally or alternatively, the voltage controlled circuit RS may be used to modulate the temperature and/or power loss of the switch 7.

Figure 8A:
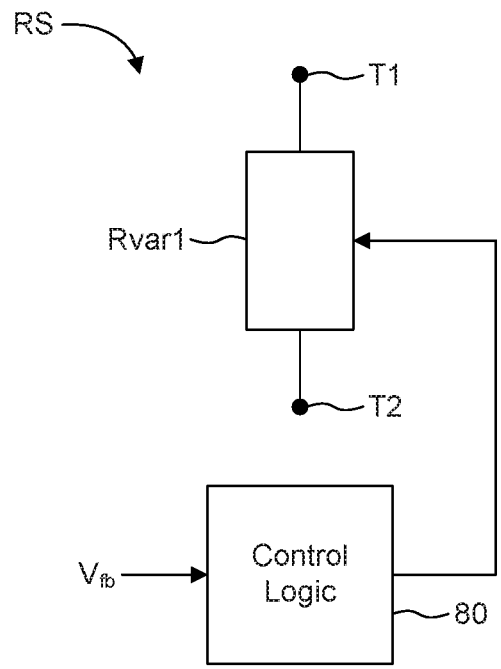
FIGS. 8A and 8B show schematic diagrams of possible configurations of a voltage controlled circuit according to one or more embodiments.
Figure 8B:
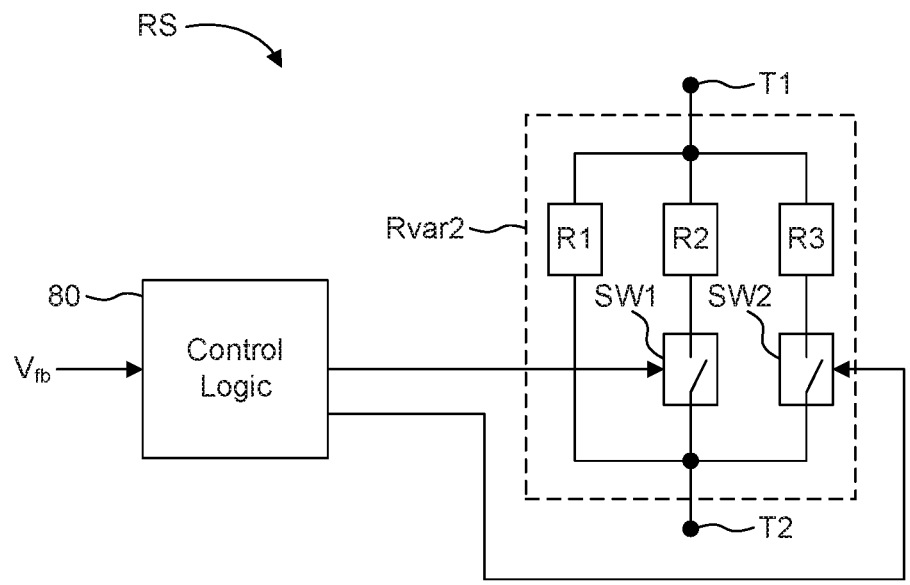

FIGS. 8A and 8B show schematic diagrams of possible configurations of a voltage controlled circuit RS according to one or more embodiments.

The voltage controlled circuit RS shown in FIG. 8A includes control logic 80 and a variable resistor Rvar1. The terminals T1 and T2 of the variable resistor Rvar1 represent the terminals of block RS shown in the other figures.

The control logic 80 receives a voltage feedback parameter Vfb. The voltage feedback parameter may be a voltage across the DC capacitor (i.e., $V_{Dcout}$), or a voltage drop across the switch 7 (i.e., $V_{DS}$). The control logic 80 compares the voltage feedback parameter Vfb to one or more thresholds and generates a control signal that controls the resistance of the variable resistor Rvar1 based on the threshold comparison.

The voltage controlled circuit RS shown in FIG. 8A includes control logic 80 and a variable resistor circuit Rvar2. The terminals T1 and T2 of the variable resistor circuit Rvar2 represent the terminals of block RS shown in the other figures. The variable resistor circuit Rvar2 includes parallel resistive branches as the current regulating circuitry, where one or more of which are selectively enabled or disabled by the control logic 80 to increase or decrease the resistance of RS based on a feedback parameter. Here, three parallel resistive branches are shown that include resistors R1, R2, and R3, respectively. Furthermore, switches SW1 and SW2 are provided to selectively enable or disable a respective resistive branch. Depending on whether switches SW1 and SW2 are enabled or disabled, the total effective resistance of the variable resistor circuit Rvar2 can be varied.

The control logic 80 receives a voltage feedback parameter Vfb. The voltage feedback parameter may be a voltage across the DC capacitor (i.e., $V_{Dcout}$), or a voltage drop across the switch 7 (i.e., $V_{DS}$). The control logic 80 compares the voltage feedback parameter Vfb to one or more thresholds and generates control signals that control respective switches SW1 and SW2 based on a control function that uses the threshold comparison to achieve total effective resistance.

For example, the control logic 80 may be configured to generate a comparison result based on comparing the voltage feedback parameter Vfb to a threshold value, and switch the total effective resistance of the current regulating circuitry between a first resistance value and a second resistance value based on the comparison result. Multiple thresholds and additional resistance values may be implemented, as described in conjunction with FIGS. 8A and 8B.

Thus, the voltage controlled circuit RS is representative of the control function that implements active feedback control of the resistance RS and the current $I_{DS}$ of the switch 7. The control logic being configured based on a control function to determine the resistance of RS. For example, as shown in FIG. 8B, the voltage controlled circuit RS may include parallel resistive branches as the current regulating circuitry, where one or more of which are selectively enabled or disabled by the control logic to increase or decrease the resistance of RS based on a feedback parameter Vfb. For example, the feedback parameter Vfb may be $V_{DCout}$ or $V_{DS}$. Thus, a voltage sensor to provide voltage feedback and control logic to control the switches of each resistive branch based on the voltage feedback may be implemented to adjust the resistance of RS. The current $I_{DS}$ flowing through the switch 7 is controlled by changing the total effective resistance of RS.

Alternatively, as shown in FIG. 8A, the current regulating circuitry may be an adjustable resistor whose resistance is dependent on the feedback parameter Vfb (e.g., $V_{DC}$ or $V_{DS}$). Again, a voltage sensor to provide voltage feedback and control logic configured to adjust the resistance of the adjustable resistor based on the voltage feedback may be implemented to adjust the total effective resistance of RS.

Based on the above, active control of the current increase of the current $I_{DS}$ through the switch 7 (and temperature increase) is provided by the voltage controlled circuit RS as the DC capacitor 3 charges to steady-state (i.e., during the power-up phase). By controlling or limiting the current $I_{DS}$, the inrush current flowing through to the input bridge rectifier 2 and DC capacitor 3 can be controlled and limited based on the charging of the DC capacitor 3. That is, current $I_{DS}$ directly impacts the current flowing through the main current loop that includes the current flowing through the DC capacitor 3, the switch 7 and the input bridge rectifier 2. By limiting current $I_{DS}$, the current flowing through the DC capacitor 3 and the input bridge rectifier 2 is also limited.

The control function will now be described in more detail. The voltage controlled circuit RS includes current regulating circuitry Rvar1 or Rvar2 and control logic 80 integrated into the silicon of the SSR 6 and has an adjustable total effective resistance. The voltage controlled circuit RS is configured to actively change its resistance value according to a control function based on a control strategy. The control function may be a rule set or a formula by which the resistance changes according to a feedback parameter. The control function may be a function of voltage. For example, the feedback parameter may be a voltage across the DC capacitor (i.e., $V_{Dcout}$), or a voltage drop across the switch 7 (i.e., $V_{DS}$). However, it will be appreciated that any voltage drop along the main current loop between the input stage and the output stage may be used as the feedback parameter. Thus, the resistance value of RS changes according to a function of $V_{DCout}$, $V_{DS}$, or some other voltage feedback parameter.

As shown in FIGS. 8A and 8B, the control function may include a multi-stage switching operation or adjustment of the total effective resistance of RS to modulate the current flowing through the switch 7 and/or to modulate the temperature of the switch 7. For example, in a three-stage switching strategy, the resistance of RS may switch between three values based on a function of the voltage $V_{DCout}$, which increases as the DC capacitor 3 is charged to steady state during the power-up phase. For example, the resistance of RS may be set at 1.75 ohms when $V_{DCout}$ is equal to or less than 240V; 0.75 ohms when $V_{DCout}$ is equal to or less than 300V and greater than 240V; and 0.25 ohms when $V_{DCout}$ is greater than 300V. At 0.25 ohms, there is no longer any current limitation effect provided by the SSR 6. Thus, 0.25 ohms represents a resistance value at which there is no current limitation on $I_{DS}$.

According to the above example, the resistance of RS actively changes between three values based on the value of $V_{DCout}$. By changing the resistance of RS according to a voltage feedback control, the current through the switch 7 is also controlled and can be limited during the power-up phase of the electric power system 100 (e.g., until the driver stage reaches a steady state).

Here, the charging time of the DC capacitor 3 may be controlled based on the control function. For example, the resistance values of RS may be selected to allow a faster charging (i.e., lower charging time) or slower charging (i.e., higher charging time) of the DC capacitor 3. Furthermore, it will be appreciated that the number of control stages are not limited. In addition, the value of RS may also be controlled based on a continuous basis and/or based on linear function, instead of in discrete stages.

Alternatively, if using $V_{DS}$ as the feedback parameter, an inverse relationship may be used with respect to the control function of the resistance of RS since $V_{DS}$ decreases as the DC capacitor 3 is charged to steady state (i.e., as $V_{DCout}$ increases).

Another control strategy may include maintaining a power loss of the switch 7 to be constant over time. For example, the voltage drop $V_{DS}$ across the switch 7 may be used as an input current feedback parameter. For example, if the voltage $V_{DS}$ is greater than a threshold, the current $I_{DS}$ is reduced, and, if the voltage $V_{DS}$ is equal to or less than the threshold, the current $I_{DS}$ is increased, such that the power loss across the switch 7 is substantially constant (i.e., within a 5% error tolerance) regardless of $V_{DS}$. Thus, the resistance of RS may be controlled based on this control strategy.

Similar principles can be extended to modulate the temperature of the switch of the SSR 6. For example, the power loss of the switch 7 can be limited by controlling the current $I_{DS}$ such that a temperature value of the switch is controlled and/or limited. In other words, the temperature increase of the switch 7 can be controlled (e.g., reduced). However, by reducing the temperature increase, the charge time of the DC capacitor 3 will be increased (i.e., slower).

Figure 2A:
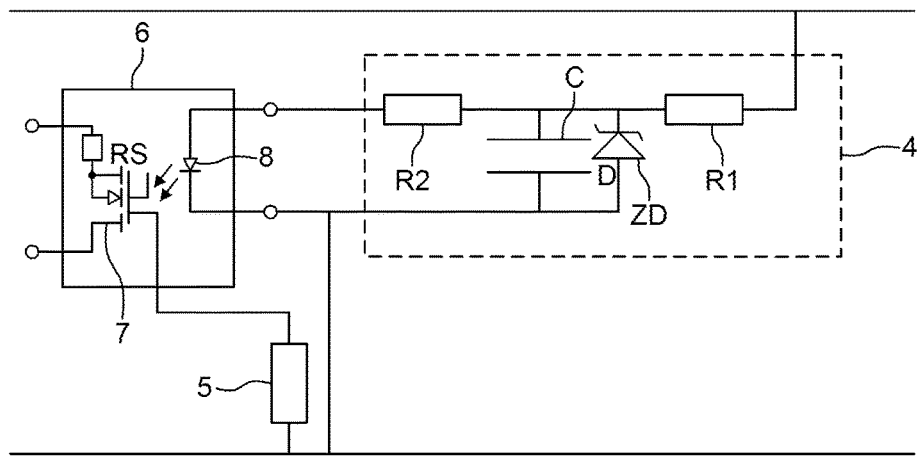
FIGS. 2A-2C show schematic diagrams of the electric power system with different example implementations of a LED current regulator according to one or more embodiments.
Figure 2B:
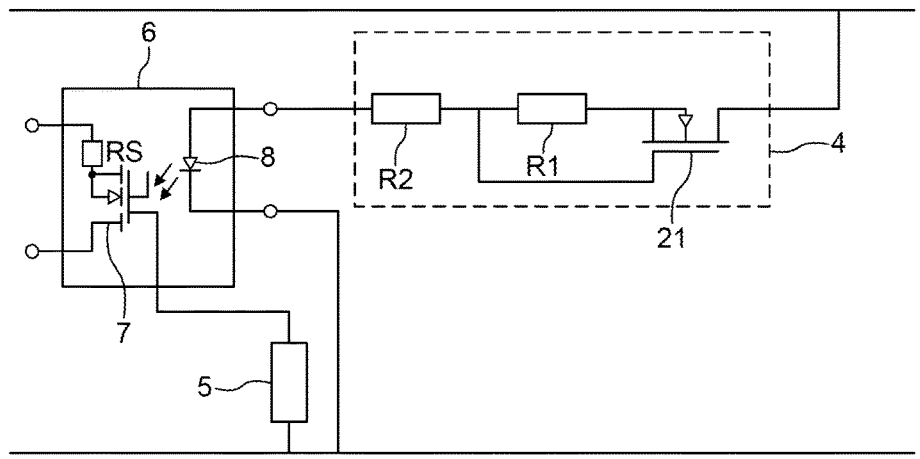
Figure 2C:
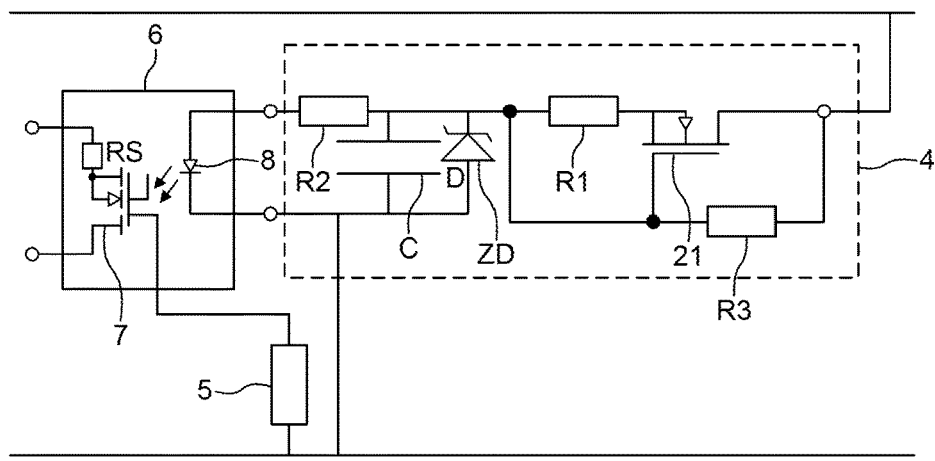

Therefore, depending on the implemented control strategy not only the inrush current but also the temperature rise of switch 7 can be controlled. The active control of the current limitation could be used to either limit the power dissipation of switch 7 or limit the current through the switch 7 itself. This approach may provide a space saving, efficient, self-powered, and temperature independent solution for high integrated, low-power applications FIGS. 2A-2C show schematic diagrams of the electric power system 100 with different example implementations of the LED current regulator 4 according to one or more embodiments. The LED current regulator 4 is configured to provide a sufficient LED current to turn-on the switch 7 of the SSR 6. In principle, any circuitry configured to generate a constant current can be used to feed the LED 8.

In FIG. 2A, LED current regulator 4 includes a combination of voltage divider comprising resistors R1 and R2, capacitor C, and Zener diode ZD to condition the LED current $I_{LED}$.

In FIG. 2B, the LED current regulator 4 includes a combination of a high-voltage depletion MOSFET 21 in current source mode and a voltage divider comprising resistors R1 and R2 to condition the LED current $I_{LED}$. The depletion MOSFET 21 used in the LED current regulator 4 enables the LED current $I_{LED}$ to increase to and stabilize at a constant current value once the DC capacitor 3 is sufficiently charged to a certain value.

In FIG. 2C, the LED current regulator 4 includes a combination of a high-voltage depletion MOSFET 21 in current source mode, a voltage divider comprising resistors R1 and R2, a capacitor C, a Zener diode ZD, and a further resistor R3 to condition the LED current $I_{LED}$. The depletion MOSFET 21 used in the LED current regulator 4 enables the LED current $I_{LED}$ to increase to and stabilize at a constant current value once the DC capacitor 3 is sufficiently charged to a certain value.

Figure 3:
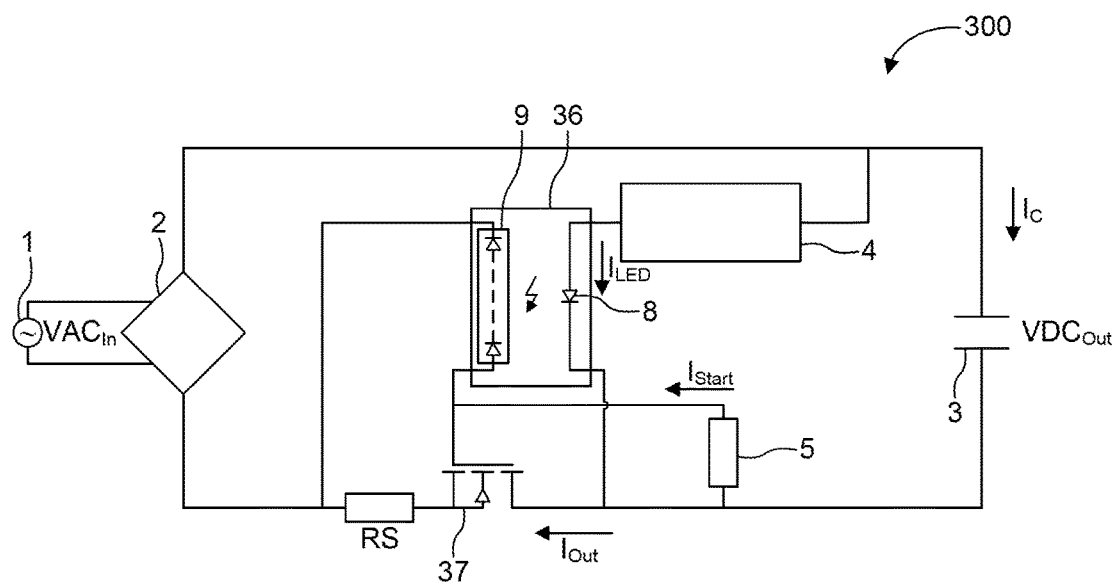
FIG. 3 shows a schematic diagram of an electric power system according to one or more embodiments.

FIG. 3 shows a schematic diagram of an electric power system 300 according to one or more embodiments. In particular, the electric power system 300 includes a photovoltaic isolation (PVI) device 36 that is configured to drive an external switch 37. Similar to electric power system 100, electric power system 300 includes an AC voltage source 1 that generates a single phase AC input voltage $V_{ACin}$ and supplies $V_{ACin}$ to the input bridge rectifier 2, which charges the DC capacitor 3. The DC capacitor 3 stores an output DC voltage $V_{DCout}$, which may then be supplied to a load. The electric power system 300 also includes an LED current regulator 4 and a start-up resistor 5.

The LED current regulator 4, the resistor RS, the PVI device 36, and the external switch 37 are used to control and/or limit the inrush current that may be generated during the power-up phase of the electric power system 300, prior to the DC capacitor 3 reaching a steady-state. Here, the combination of the resistor RS, the PVI device 36, and the external switch 37 may be referred to as a voltage controlled active semiconductor device.

The LED current regulator 4 may be implemented in a similar manner as the examples provided in FIGS. 2A-2C, or as any other device or circuitry described herein.

The PVI device 36 implements optical coupling between a primary side where the LED 8 is provided and a secondary side where a sensor 9, including photo-sensitive diodes, is provided. The optical coupling is implemented in a similar manner as the optical coupling implemented the SSR 6 in FIG. 1. That is, the secondary side is coupled to the control terminal (gate) of the switch 37 in order to operate the switch 37 in linear mode based on the control current $I_{LED}$ from the primary side.

Since the LED current regulator 4 is behind the switch 37, the start-up resistor 5 is used to trigger a current flow through the LED 8. Initially, during a start-up phase, current flows from the input bridge rectifier 2, through the DC capacitor 3, through the start-up resistor 5, to the gate of the switch 37. The switch 37 is a normally-off device. However, in combination with the start-up resistor 5, the switch 37 and the start-up resistor 5 behave like a normally-on switch. The start-up phase is an initial phase of the power-up phase.

This initial start-up current $I_{start}$ charges the gate slightly (i.e., pre-charge), which results in the switch 37 turning on slightly and to start conducting. This charging of the gate enables the control current $I_{LED}$ to start flowing through the LED 8. The current $I_{LED}$ flowing through the LED 8 is then used to further charge the gate (e.g., via optical coupling) to further or fully turn on the switch 37. Therefore, during the very first moment of the power-up process, the start-up resistor 5 ensures a pre-charging of the gate which initiates a current flow $I_{LED}$ through the LED 8. In other words, the switch 37 may already be turned on slightly due to charging of the gate before control current $I_{LED}$ starts to flow through the LED 8. Once the control current $I_{LED}$ starts to flow through the LED 8, the start-up phase can be regarded as complete. In addition, once the control current $I_{LED}$ starts to flow, the DC capacitor 3 also begins to charge.

The control current $I_{LED}$ flowing through the LED current regulator 4 continues to increase until it reaches a certain value that is sufficient to operate the switch 37 in linear mode (i.e., when $V_{GS}>V_{th}$ and $V_{DS}\geq(V_{GS}-V_{th})$, where $V_{th}$ is a voltage threshold of the transistor). Upon entering linear mode, the switch 37 is regarded as fully turned on. For example, a control current $I_{LED}$ of 3 mA may be sufficient to transfer enough power to the photo-sensitive diodes 9 such that the gate voltage is sufficient to operate the switch 37 in linear mode. Meanwhile, the DC capacitor 3 continues to charge.

Once the control current $I_{LED}$ reaches the certain value to enable linear mode operation of the switch 37, further control of switch 37 is taken over by the PVI device 36. Once the current Iout through the output stage reaches a pre-defined level, the PVI device 36 itself will limit the charging current by operating the output stage in linear mode operation. In steady-state operation, the DC voltage $V_{DCout}$ will stabilize the operation of the PVI device 36.

In addition, the resistance value of the start-up resistor 5 is selected such that, following the start-up phase and including steady-state operation, the start-up resistor 5 is substantially bypassed so that power losses through the start-up resistor 5 are negligible. Thus, after the start-up phase, current flows from input bridge rectifier 2, through the DC capacitor 3, and substantially bypasses the start-up resistor 5. Instead of flowing through the start-up resistor, the current Iout flows through the switch 37 from drain to source, through resistor RS, and back to the input bridge rectifier 2. In addition, a small current continuously flows through the LED current regulator 4. Thus, once the control current $I_{LED}$ reaches the certain value, the LED current regulator 4 behaves as a constant current source to the LED 8 of the PVI device 36 to maintain operation of the switch 7 in linear mode. For example, the control current $I_{LED}$ may be maintained at 3 mA according to the previous example to maintain operation of the switch 37 in linear mode.

The feedback resistor RS symbolizes the implementation of a voltage controlled current limitation. In other words, the feedback resistor RS is not simply a resistor but is instead a voltage controlled circuit that includes current regulating circuitry coupled to the current path of $I_{DS}$ of the switch 37 and control logic. For example, as shown in FIG. 3, the voltage controlled circuit RS is coupled to a source terminal of the switch 37.

Thus, the voltage controlled circuit RS in FIGS. 1 and 3 are implemented in a similar matter. For example, similar to the resistor RS of FIG. 1, a control function is built into the current regulating circuitry and the control logic to actively change a resistance of the voltage controlled circuit (i.e., of the feedback resistor RS) to modulate the current $I_{DS}$ flowing through the switch 37. That is, the voltage controlled circuit RS is an adjustable resistive device with active feedback control of the resistance. Additionally or alternatively, the voltage controlled circuit RS may be used to modulate the temperature and/or power loss of the switch 37. Also similar to RS of FIG. 1, $V_{DCout}$ or $V_{DS}$ of switch 37 may be used by the control logic as voltage feedback parameters for controlling the resistance of the voltage controlled circuit RS.

Figure 4:
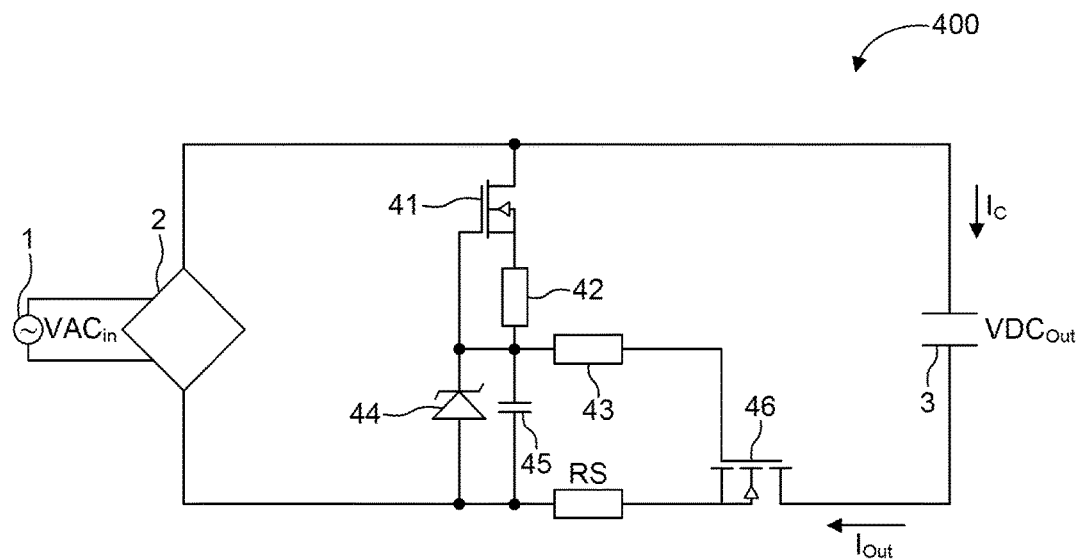
FIG. 4 shows a schematic diagram of an electric power system according to one or more embodiments.

FIG. 4 shows a schematic diagram of an electric power system 400 according to one or more embodiments. In particular, the electric power system 400 provides a discrete configuration with a voltage controlled circuit RS to regulate the current Iout in a similar manner described in FIGS. 1 and 3. However, in this case, a primary side and a secondary side of the powering circuit are not isolated from each other, as in the case of using an SSR, for example. Thus, the output stage of the electric power system 400 is replicated with discrete components instead of an SSR and an LED current regulator. The discrete components include a depletion MOSFET 41, resistors 42 and 43, a Zener diode 44, a capacitor 45, and an enhancement MOSFET 46. The depletion MOSFET 41 may also be replaced by an enhancement MOSFET, a bipolar junction transistor (BJT). In general, discrete components 41-45 may be replaced by any a start-up cell.

The voltage controlled circuit RS is coupled to the enhancement MOSFET 46 to regulate $I_{DS}$ of the MOSFET 46, and, thus, to regulate Iout. Here, components 41-46 and the voltage controlled circuit RS may be referred to as a voltage controlled active semiconductor device.

Figure 5:
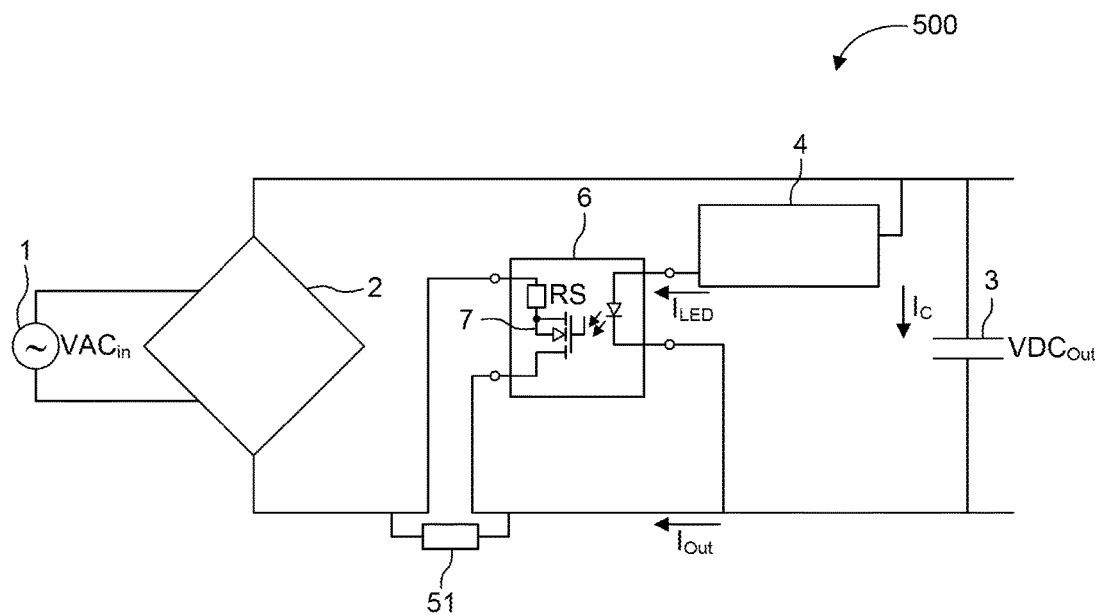
FIG. 5 shows a schematic diagram of an electric power system according to one or more embodiments.

FIG. 5 shows a schematic diagram of an electric power system 500 according to one or more embodiments. The electric power system 500 is similar to the electric power system 100 shown in FIG. 1, except a relief resistor 51 is provided in order to reduce the stress on the switch 7. In particular, the relief resistor 51 is coupled to the drain and the source terminals of the switch 7 and provides an additional current path for current Iout to flow to the input bridge rectifier 2. That is, a portion of the current Iout will flow through the relief resistor 51 instead of through the switch 7, reducing the stress of the switch 7. In this case, a start-up resistor is not needed since the current Iout will flow through the relief resistor 51 during the start-up phase, allowing current to flow through the LED current regulator 4 to begin activation of the switch 7.

Figure 6:
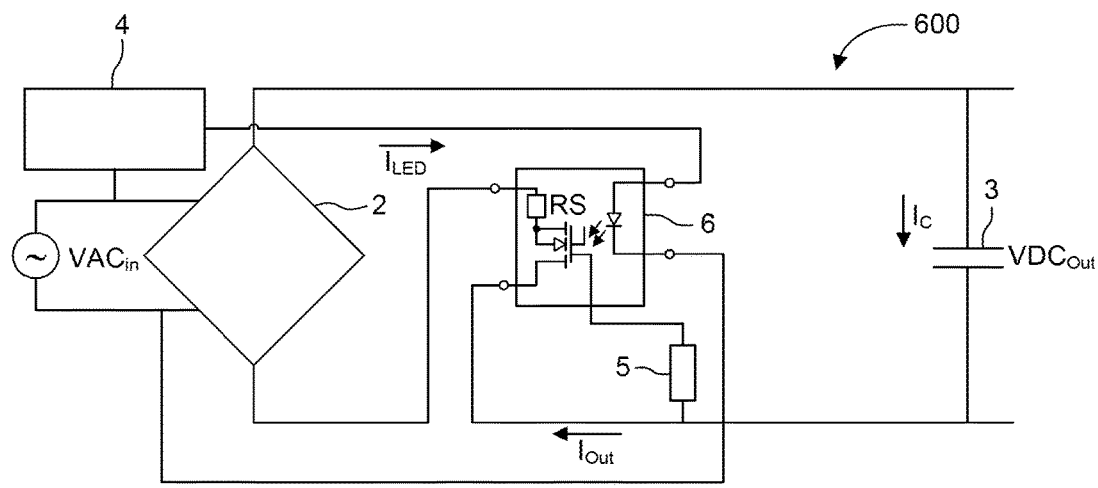
FIG. 6 shows a schematic diagram of an electric power system according to one or more embodiments.

FIG. 6 shows a schematic diagram of an electric power system 600 according to one or more embodiments. The electric power system 600 is similar to the electric power system 100 shown in FIG. 1, except the LED current regulator is provided on the AC side of the electric power system 600. Thus, AC side (input side) is used to derive control current $I_{LED}$ (i.e., primary current or LED current).

Figure 7A:
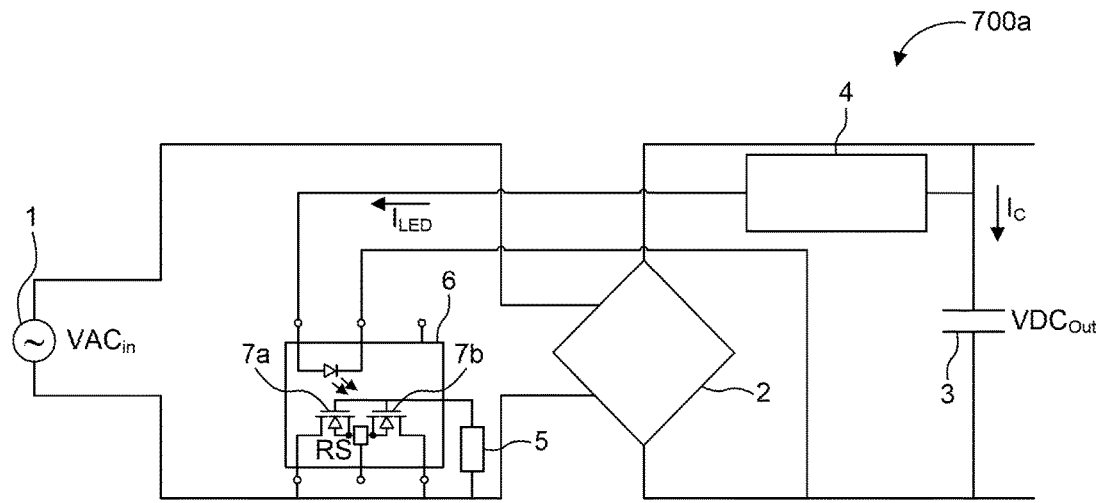
FIGS. 7A and 7B show schematic diagrams of electric power systems according to one or more embodiments in which a bipolar implementation is provided.
Figure 7B:
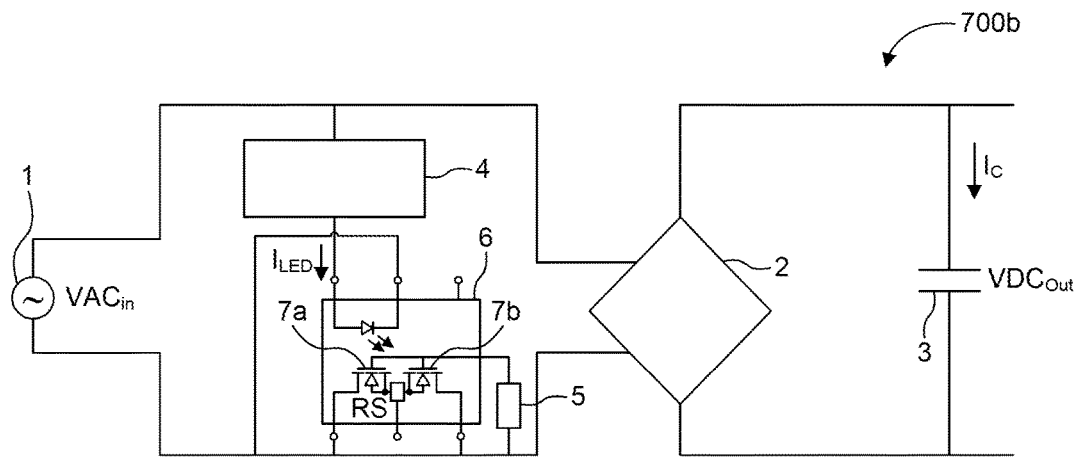

All above mentioned descriptions show approaches for unipolar current and can be extended to bipolar current as well. FIGS. 7A and 7B show schematic diagrams of electric power systems 700a and 700b according to one or more embodiments in which a bipolar implementation is provided. Here, the SSR 6 having an inrush current limiter (e.g., RS) is placed in front of the input bridge rectifier 2 and contains two anti-serial switches 7a and 7b.

Thus, for AC (bi-directional) operation two MOSFETs 7a and 7b are arranged back-to-back with their source pins tied together. Their drain pins are connected to either side of the output. However, it will be appreciated that the opposite may also be valid (i.e., that the drain pins may be tied together, and the source pins are connected to either side of the output). The substrate diodes of the MOSFETS 7a and 7b are alternately reverse biased to block current when the relay is off. When the SSR 6 is on, the common source is riding on the instantaneous signal level and both gates are biased positive relative to the source by the photo-diode.

Aside from these differences, the electric power systems 700a and 700b operate in a similar manner described above with respect to FIGS. 1 and 2A-2C.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Depending on certain implementation requirements, embodiments provided herein can be implemented in hardware or in software. The implementation can be performed using a digital storage medium, for example a floppy disk, a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A control unit including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes a computer program to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A solid-state relay, comprising:
   a switching device including a control terminal, the switching device configured to receive a control voltage at the control terminal and conduct a channel current through the switching device based on the control voltage;
   a powering circuit including a primary side that receives a control current and a secondary side isolated from the primary side, wherein the secondary side is configured to generate the control voltage based on the control current; and a voltage controlled circuit comprising a variable resistive circuit that is coupled in series with the switching device along a path of the channel current and has a total effective resistance, wherein the voltage controlled circuit is configured to regulate the channel current based on regulating the total effective resistance of the variable resistive circuit, and wherein the voltage controlled circuit is configured to receive a voltage feedback parameter and change the total effective resistance of the variable resistive circuit based on the voltage feedback parameter.

2. The solid-state relay of claim 1, wherein:

the voltage controlled circuit includes control logic implemented according to a control function, wherein the control logic is configured to receive the voltage feedback parameter and control the total effective resistance of the variable resistive circuit according to the received voltage feedback parameter and the control function.

3. The solid-state relay of claim 1, wherein:

the voltage controlled circuit is configured to measure the voltage feedback parameter and change the total effective resistance based on the measured voltage feedback parameter.

4. The solid-state relay of claim 1, wherein:

the voltage controlled circuit is configured to generate a comparison result based on comparing the voltage feedback parameter to a threshold value, and switch the total effective resistance between a first resistance value and a second resistance value based on the comparison result.

5. The solid-state relay of claim 1, wherein:

the powering circuit is configured to operate the switching device in a linear mode operation in which the channel current is in saturation; and the voltage controlled circuit is configured to change the total effective resistance while the switching device is operating in the linear mode operation.

6. The solid-state relay of claim 1, wherein the voltage feedback parameter is a voltage drop across the switching device.

7. The solid-state relay of claim 1, wherein the voltage feedback parameter is a voltage across a load.

8. The solid-state relay of claim 1, wherein:

the voltage feedback parameter is representative of an output DC voltage supplied across a load or a drain-to-source voltage of the switching device, and during a power-up phase, defined as a period from an initial start-up to a steady state, the voltage controlled circuit is configured to:

decrease the total effective resistance of the variable resistive circuit as the output DC voltage increases, or decrease the total effective resistance of the variable resistive circuit as the drain-to-source voltage decreases.

9. The solid-state relay of claim 1, wherein:

the voltage feedback parameter is representative of an output DC voltage supplied across a load or a drain-to-source voltage of the switching device, and the voltage controlled circuit is configured increase the total effective resistance of the variable resistive circuit as the drain-to-source voltage increases such that a power loss across the switching device is substantially constant over time.

10. An electric power system, comprising:

an input bridge rectifier configured to convert an alternating current (AC) voltage to a direct current (DC) supply voltage;

a DC capacitor configured to charge to a DC output voltage based on the DC supply voltage; and a voltage controlled active semiconductor device coupled to the input bridge rectifier to control a current through at least one of the input bridge rectifier and the DC capacitor, the voltage controlled active semiconductor device comprising:

a switching device including a control terminal, the switching device configured to receive a control voltage at the control terminal and conduct the current through the switching device based on the control voltage; and a voltage controlled circuit comprising a variable resistive circuit that is coupled in series with the switching device along a path of the current and has a total effective resistance, wherein the voltage controlled circuit is configured to regulate the current based on regulating the total effective resistance of the variable resistive circuit, and wherein the voltage controlled circuit is configured to receive a voltage feedback parameter and change the total effective resistance of the variable resistive circuit based on the voltage feedback parameter.

11. The electric power system of claim 10, wherein the voltage controlled active semiconductor device further comprises:

a powering circuit including a primary side that receives a control current and a secondary side isolated from the primary side, wherein the secondary side is configured to generate the control voltage based on the control current.

12. The electric power system of claim 11, further comprising:

a current regulator coupled to the powering circuit and configured to generate the control current, wherein the current regulator is configured to operate the switching device in a linear mode operation in which the current through the switching device is in saturation.

13. The electric power system of claim 10, wherein:

the voltage controlled circuit includes control logic implemented according to a control function, wherein the control logic is configured to receive the voltage feedback parameter and control the total effective resistance of the variable resistive circuit according to the received voltage feedback parameter and the control function.

14. The electric power system of claim 10, wherein:

the voltage controlled circuit is configured to generate a comparison result based on comparing the voltage feedback parameter to a threshold value, and switch the total effective resistance between a first resistance value and a second resistance value based on the comparison result.

15. The electric power system of claim 10, further comprising:

a start-up resistor coupled to the control terminal of the switching device and configured to conduct a start-up current during an initial start-up phase of the electric power system, wherein the start-up current is configured to pre-charge the control terminal of the switching device to initially turn on the switching device.

16. The electric power system of claim 15, further comprising:
a current regulator configured to generate a control current that increases to a current level sufficient to operate the switching device in a linear mode operation in which the current through the switching device is in saturation, wherein the control voltage of the switching device is derived from the control current, and
wherein the current regulator is configured to initiate the control current in response to the switching device initially turning on from the start-up current.

17. The electric power system of claim 16, wherein the voltage controlled circuit is configured to change the total effective resistance while the switching device is operating in the linear mode operation.

18. The electric power system of claim 17, wherein the voltage controlled circuit is configured to set the total effective resistance to a minimum resistance value while the DC capacitor is in a steady state.

19. The electric power system of claim 10, wherein the voltage controlled active semiconductor device is a solid-state relay.

20. The electric power system of claim 10, wherein the voltage feedback parameter is a voltage drop across the switching device.

21. The electric power system of claim 10, wherein the voltage feedback parameter is a voltage across the DC capacitor.

22. A method of controlling a current in an electric power system, the method comprising:
operating a switching device in a linear mode operation in which a current through the switching device is in saturation; and
in response to the switching device operating in the linear mode operation, regulating the current through the switching device based on a control function and a voltage feedback parameter, wherein the control function is configured to modify a resistance along a path of the current based on the voltage feedback parameter,
wherein regulating the current through the switching device comprises:
receiving the voltage feedback parameter by a control logic that implements the control function, the voltage feedback parameter being a voltage along the path of the current;
regulating, by the control logic, a total effective resistance of a variable resistive circuit based on applying the voltage feedback parameter to the control function, wherein the variable resistive circuit is coupled in series with the switching device along the path of the current.

* * * * *